No. 674,200. Patented May 14, 1901.
R. K. EMILY.
DEVICE FOR USE IN MAKING BUTTER.
(Application filed Feb. 2, 1901.)
(No Model.)
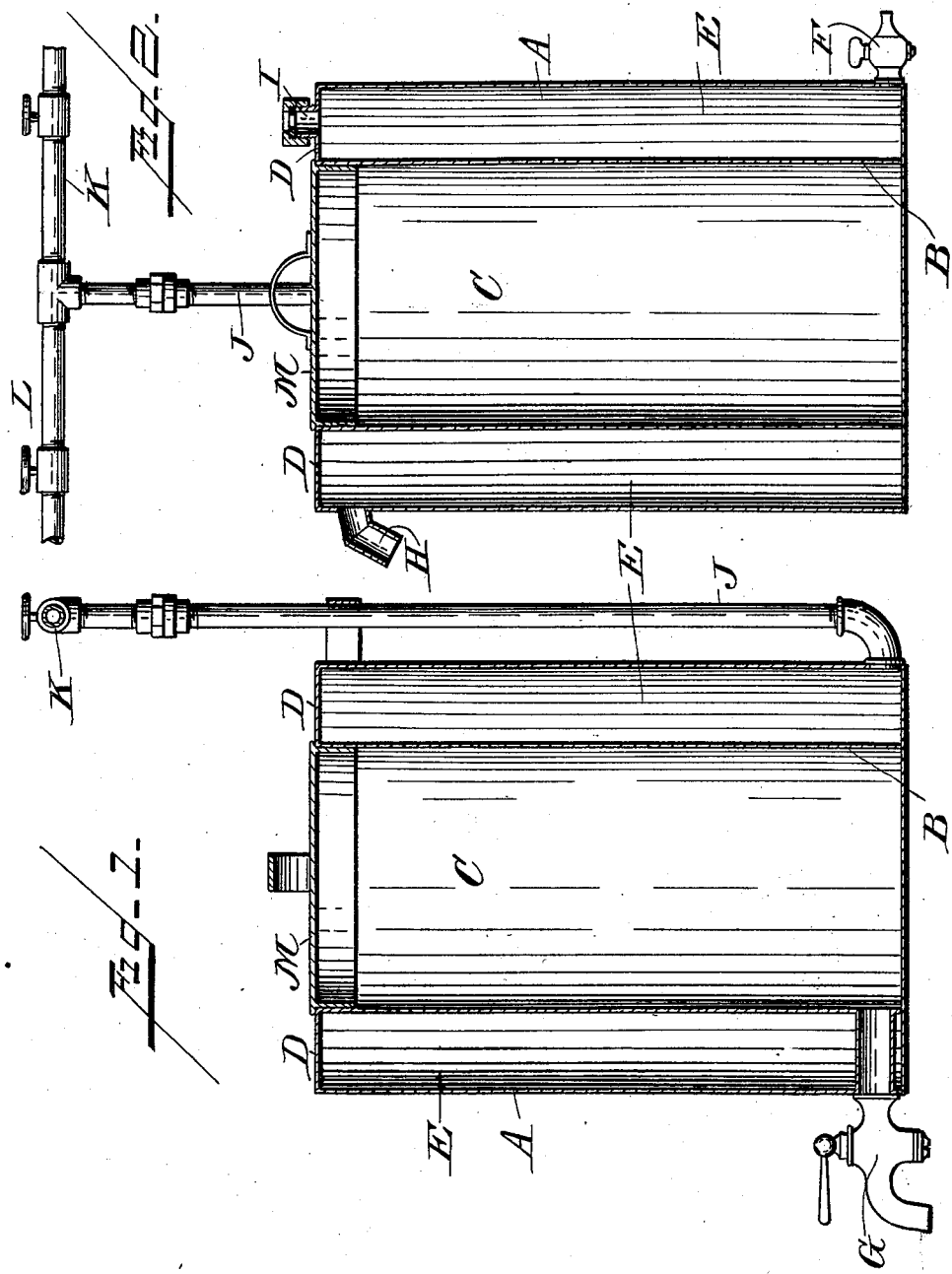
Witnesses
F. L. Ourand.
C. D. Davis
Inventor
Royal K. Emily
by R. W. Bishop.
Attorney

UNITED STATES PATENT OFFICE.

ROYAL K. EMILY, OF MANCHESTER, MINNESOTA.

DEVICE FOR USE IN MAKING BUTTER.

SPECIFICATION forming part of Letters Patent No. 674,200, dated May 14, 1901.

Application filed February 2, 1901. Serial No. 45,707. (No model.)

*To all whom it may concern:*

Be it known that I, ROYAL K. EMILY, a citizen of the United States, residing at Manchester, in the county of Freeborn and State of Minnesota, have invented certain new and useful Improvements in Devices for Use in Making Butter, of which the following is a specification.

This invention relates to the manufacture of what is known in butter-making as a "starter;" and its object is the provision of a simple and effective apparatus by the use of which the starter or flavor-producing germ may be easily and continuously cultivated. This object is attained by the use of the device illustrated in the accompanying drawings; and the invention consists in certain novel features hereinafter described and claimed.

In the drawings referred to, Figure 1 is a vertical transverse section of an apparatus embodying my invention, and Fig. 2 is a vertical section taken at right angles to Fig. 1.

In carrying out my invention I employ a can A, having an inner wall B rising from its bottom parallel with the outer wall and forming a central receptacle C for the milk. The space between the inner and outer walls is covered by an annular plate D, permanently secured to the upper edges of the said walls, thus forming a closed chamber E. A discharge-faucet or valved outlet F leads from the bottom of this closed chamber to permit emptying of the same when it is desired to clean or repair the apparatus, and a similar larger discharge G leads from the bottom of the central receptacle C through the closed chamber to draw off the milk after treatment. Near the top of the closed chamber, in the outer wall of the same, is an overflow H, and in the annular plate or top D is an opening I, in which a thermometer is fitted and held. Communicating with the bottom of the chamber E through the outer wall of the same is a pipe J, rising to a convenient point above the can, where it is connected by a union or T-coupling to a valved steam-pipe K and a valved water-pipe L, as shown. An air-tight cover M is provided for the central receptacle.

The use of the apparatus will be readily understood. The device is intended specially for treating milk so as to destroy all those germs which impart a bad flavor and cultivate the germs which impart a fine flavor to the butter. The closed chamber E is always filled with water. The milk to be treated is placed in the central receptacle and the cover placed thereon. The valve in the steam-pipe is then opened and steam admitted through the pipe J to the chamber E. This steam, acting on the water in the closed chamber, will slowly raise the temperature of the water, and the water will in turn raise the temperature of the milk to about 180°. When this temperature is reached, the supply of steam is cut off by closing the valve, and the apparatus is allowed to stand about twenty minutes, so that all germs or bacteria in the milk will be destroyed. After this interval the valve in the water-pipe is opened and cold water admitted to the closed chamber, thereby rapidly cooling said chamber and the milk. When the milk is brought to the proper low temperature for the propagation of the desired bacteria, it is inoculated with a culture of fine-flavor-producing germs. It is then covered air-tight and then permitted to ferment or ripen, the properly-ripened milk constituting a starter or flavor-producing culture, which is added to the cream to hasten the production of the butter and impart a rich flavor to the same. After the milk has been drawn off to be added to the cream a fresh supply of milk may be placed in the can for treatment and the operation repeated.

When steam is admitted to the chamber E, it tends to condense in the cold water; but its pressure causes a movement of the water through the overflow, and the temperature is therefore gradually raised. A sudden increase in the temperature is not desirable; but a quick lowering of the temperature is rather beneficial, and no objection is found to the cold water which is subsequently admitted, quickly forcing the steam and hot water from the chamber through the overflow.

The device is very simple in its construction and is easily operated.

If desired, the cans may be arranged in gangs controlled by common steam and water pipes. Heating may then occur in one can at the same time that cooling takes place in another.

Having thus described my invention, what I claim, and desire to secure by Letters Patent, is—

The improved starter-can herein described and shown consisting of a single bottom plate, concentric walls rising from said bottom plate and having their upper edges connected permanently by a fixed annular plate whereby a central milk-receptacle and an outer closed water-chamber are formed, an air-tight cover removably fitted in the upper end of the milk-receptacle, independent valved discharges leading from the lower ends of the milk-receptacle and the water-chamber, a valveless overflow in the outer wall at the top of the same, and a single feed-pipe communicating with the water-chamber at the lower end of the same and provided with connections to sources of steam and cold-water supply.

In testimony whereof I have signed this specification in the presence of two subscribing witnesses.

ROYAL K. EMILY.

Witnesses:
C. S. SWENSON,
JAS. ADAIR.